(12) United States Patent
Thakore et al.

(10) Patent No.: US 12,259,831 B2
(45) Date of Patent: Mar. 25, 2025

(54) HARDWARE STATE REPORTING USING INTERRUPT PINS

(71) Applicant: Beijing Tenafe Electronic Technology Co., Ltd., Beijing (CN)

(72) Inventors: Priyanka Nilay Thakore, Mountain View, CA (US); Lyle E. Adams, San Jose, CA (US); Haibo Zhu, Plano, TX (US)

(73) Assignee: Beijing Tenafe Electronic Technology Co., Ltd. (CN)

( * ) Notice: Subject to any disclaimer, the term of this patent is extended or adjusted under 35 U.S.C. 154(b) by 126 days.

(21) Appl. No.: 18/221,230

(22) Filed: Jul. 12, 2023

(65) Prior Publication Data

US 2024/0036869 A1 Feb. 1, 2024

Related U.S. Application Data

(60) Provisional application No. 63/393,460, filed on Jul. 29, 2022.

(51) Int. Cl.
*G06F 13/24* (2006.01)

(52) U.S. Cl.
CPC .................... *G06F 13/24* (2013.01)

(58) Field of Classification Search
CPC .. G06F 13/24; G06F 11/2231; G06F 11/2273; G06F 15/7807
See application file for complete search history.

(56) References Cited

U.S. PATENT DOCUMENTS

| 7,130,951 B1 * | 10/2006 | Christie | G06F 9/4812 |
| | | | 710/262 |
| 8,139,070 B1 * | 3/2012 | Ostiguy | G06T 1/20 |
| | | | 345/506 |
| 8,368,701 B2 | 2/2013 | Paltashev | |
| 8,799,723 B2 | 8/2014 | Ladd | |
| 8,990,536 B2 | 3/2015 | White | |
| 9,442,824 B2 | 9/2016 | Gainey, Jr. | |
| 10,185,675 B1 * | 1/2019 | Seshadri | G06F 13/28 |
| 10,387,992 B2 | 8/2019 | Appu | |
| 2004/0187122 A1 * | 9/2004 | Gosalia | G06F 9/5016 |
| | | | 718/100 |
| 2007/0130569 A1 * | 6/2007 | Heffley | G06F 9/4812 |
| | | | 718/108 |
| 2009/0228895 A1 * | 9/2009 | Ding | G06F 9/5011 |
| | | | 718/107 |

(Continued)

*Primary Examiner* — Phong H Dang
(74) *Attorney, Agent, or Firm* — Van Pelt, Yi & James LLP

(57) ABSTRACT

Configuration information is sent from a configuration controller to a processor module in a System On Chip (SOC) and associated with firmware. In response to receiving the configuration information, context switching associated with an interrupt pin in the processor module is disabled. Hardware state information is sent from a hardware functional module in the SOC to the interrupt pin. In response to receiving the hardware state information, the processor module determines, based at least in part on the hardware state information and after completing any active firmware operations per the disabled context switching, a response. The response is received at a responding module and the responding module performs a process associated with the response.

10 Claims, 9 Drawing Sheets

(56) References Cited

U.S. PATENT DOCUMENTS

| | | | |
|---|---|---|---|
| 2011/0271088 A1* | 11/2011 | Princen | G06F 9/461 |
| | | | 718/1 |
| 2020/0320028 A1* | 10/2020 | Hubbard | G06F 13/4291 |
| 2022/0043763 A1* | 2/2022 | Moser | G06F 13/24 |

* cited by examiner

╭─ 400

| Bits in Interrupt Bus | Driven By | Usage | |
|---|---|---|---|
| [*i*:0] | Hardware Functional Module 1 | For Hardware Functional Module 1 to Notify Processor Module(s) | ← 402 |
| ⋮ | ⋮ | ⋮ | |
| [*k-1:j*] | Hardware Functional Module *m* | For Hardware Functional Module *m* to Notify Processor Module(s) | ← 404 |
| [*k+n*-1:*k*] | Interrupt Registers That Processor Modules Can Write To | For Other Processor Module(s) to Notify Processor Module 1 | ← 406 |
| ⋮ | ⋮ | ⋮ | |
| [k+n2-1: k+n(n-1)] | Interrupt Registers That Processor Modules Can Write To | For Other Processor Module(s) to Notify Processor Module *n* | ← 408 |

FIG. 4A

HARDWARE STATE REPORTING USING INTERRUPT PINS

CROSS REFERENCE TO OTHER APPLICATIONS

This application claims priority to U.S. Provisional Patent Application No. 63/393,460 entitled HARDWARE STATE REPORTING USING INTERRUPT PINS filed Jul. 29, 2022 which is incorporated herein by reference for all purposes.

BACKGROUND OF THE INVENTION

Many System On Chip (SOC) devices include a combination of hardware functional modules and a firmware complex in which firmware runs on one or more (e.g., third-party) processor modules. For cost and/or lead-time reasons, standard (e.g., off the shelf) processor modules are preferred over custom processor modules. New techniques which lend themselves to performance improvements in an SOC without requiring the use of custom processor modules would be desirable.

BRIEF DESCRIPTION OF THE DRAWINGS

Various embodiments of the invention are disclosed in the following detailed description and the accompanying drawings.

FIG. 4A is a table illustrating an embodiment of bits in an interrupt bus and their associated usage.

DETAILED DESCRIPTION

Figure 1:
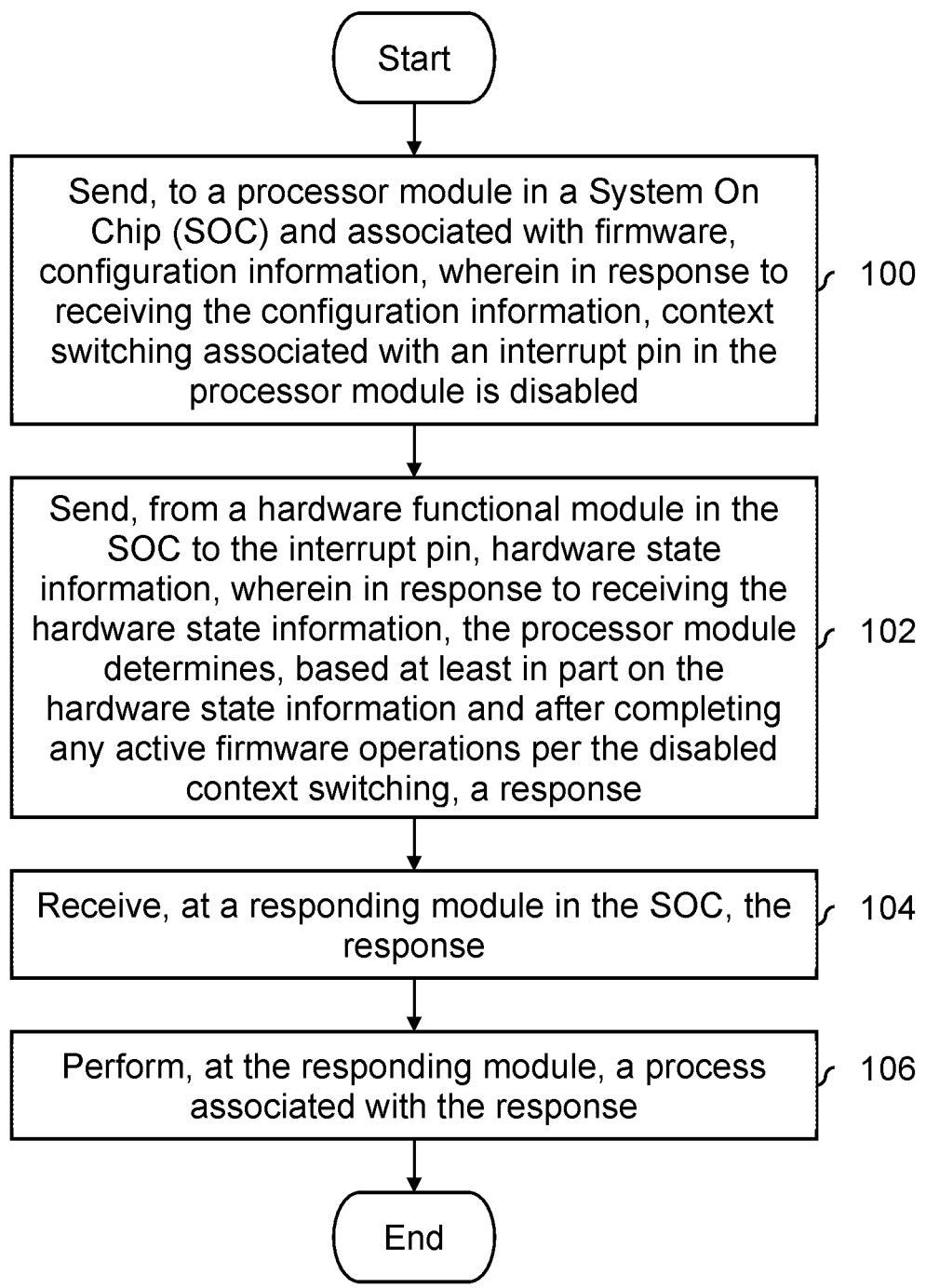
FIG. 1 is a flowchart illustrating an embodiment of a process for sending a notification using an interrupt pin in a processor module.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a technique to report a notification and/or hardware state information from a hardware functional module to a (e.g., standard, non-custom) processor module using an interrupt pin are described herein. Using an interrupt pin permits firmware to respond to the notification and/or hardware state information in a timely manner using a standard, third-party processor module (e.g., that is available "off the shelf" and/or under non-exclusive license), as opposed to having the third-party IP provider create a custom processor module (e.g., with a custom pin or other custom interface for the notification to be communicated and responded to in a timely manner). In some embodiments, context switching is disabled for the interrupt pin to which a notification and/or hardware state information is sent. For example, context switching can be disruptive and in at least some applications it is preferable for firmware to complete a current operation or instruction before turning its attention to the notification that is sent via an interrupt pin. As will be described in more detail below, in some embodiments, there are multiple hardware functional modules which can (e.g., individually and/or independently) send a notification (e.g., hardware state information) to one or more specified and/or targeted (e.g., standard, non-custom) processor modules via one or more interrupt pins.

FIG. 1 is a flowchart illustrating an embodiment of a process for sending a notification using an interrupt pin in a processor module. In some embodiments, the process of FIG. 1 is performed by a (e.g., standard) processor module in a System On Chip (SOC) where firmware runs on the (e.g., standard) processor module.

At 100, configuration information is sent to a processor module in a System On Chip (SOC) and associated with firmware, wherein in response to receiving the configuration information, context switching associated with an interrupt pin in the processor module is disabled. In some embodiments, the configuration information is sent to a processor module at 100 during an initialization sequence or process.

Different processor modules (e.g., from different third-party IP providers) may have different configuration interfaces and depending upon the provided or exposed configuration interface, the configuration information may be sent or otherwise provided at step 100 in an appropriate manner. A module and/or (e.g., electronic) components which perform(s) step 100 are referred to herein as a configuration controller. In one example, context switching associated with an interrupt pin is disabled via a register within or associated with the processor module and the configuration controller writes the appropriate value to the relevant registers to turn off context switching at step 100. In some embodiments, a configuration controller is a processor that performs a boot and/or initialization sequence. In some embodiments, a configuration controller is associated with and/or part of a firmware complex.

In some embodiments, the processor module recited in step 100 is a standard (i.e., not customized) microprocessor core that is obtained from a third-party IP provider under non-exclusive license. In some embodiments, the processor module recited in step 100 has multiple interrupt pins and some subset of them is configured as described in step 100 (i.e., subset of the interrupt pins in a processor module has context switching disabled).

At 102, hardware state information is sent, from a hardware functional module in the SOC to the interrupt pin, wherein in response to receiving the hardware state information, the processor module determines, based at least in part on the hardware state information and after completing any active firmware operations per the disabled context switching, a response.

For example, the hardware state information may be associated with a time-sensitive event where it is desirable for a firmware complex (e.g., which includes the processor module and firmware that runs on the processor module) to respond to the hardware state information in a timely manner. One example application which will be described in more detail below is notifying a firmware complex (and having said firmware complex respond in a timely manner) when a host interface receives a new command or instruction from a host. However, because context switching is disruptive and undesirable in at least some applications, context switching associated with the interrupt pin (that is used to exchange the notification and/or hardware state information) is turned off or otherwise disabled. For example, with context switching disabled, the processor module would complete any active firmware operations before processing and analyzing the hardware state information in order to determine an appropriate response.

In some embodiments, context switching disabled handling rules are configured and/or prioritized (e.g., at step 100) so that a notification and/or hardware state information received via an interrupt pin (e.g., at 102) has a higher priority compared to (e.g., ordinary and/or standard) messages, instructions, and/or communications that are (e.g., routinely) exchanged in an SOC.

If context switching were not disabled for an interrupt pin, then in the processor module, the notification and/or hardware state information that is sent via the interrupt pin (with context switching enabled) would cause a context change (e.g., causing the processor module to interrupt work on any current and/or active (e.g., mid-operation) firmware operations (e.g., mid-operation) and "jumping" to service the interrupt pin). With context switching disabled, the hardware state information can be processed and/or analyzed in a timely and not disruptive manner (e.g., including by completing any active (e.g., mid-operation) firmware operations).

At 104, the response is received at a responding module in the SOC. In some embodiments, the responding module is a hardware functional module in the SOC. Alternatively, the responding module may be some other (e.g., hardware functional) module in the SOC.

At 106, a process associated with the response is performed at the responding module. For example, the response may be a message or communication that includes or is associated with some command, instruction, or operation that causes the responding module to perform the command or operation included in or associated with the message. Some example processes (e.g., performed at 106) include clearing a queue or other memory, resetting a state machine (e.g., in the responding module), resetting the entire responding module, etc.

Depending upon the hardware state information and/or the corresponding response, the responding module (e.g., at 104 and 106) may be the same module as the hardware functional module that reported the hardware state information (e.g., 102). For example, if a hardware functional module reports (e.g., at 102) that it is in an error state and the response is to reset that hardware functional module, then the (e.g., reporting) hardware functional module (e.g., at 102) is also the responding module (e.g., at 104 and 106).

In some embodiments, the responding module (e.g., at 104 and 106) and the (e.g., reporting) hardware functional module (e.g., at 102) are different. For example, some responses may require a module that is upstream of the reporting module to be reset or otherwise reconfigured. In another example, the response is to read some buffer module where the buffer module is not the hardware functional module that reported or otherwise provided the hardware state information.

One benefit of this technique is that it enables or otherwise supports very low latency observation of hardware state information, but without requiring a custom processor module (which can be more expensive and require significant design time). This technique allows a (e.g., standard) processor module to view current and/or up-to-date hardware state information and respond quickly.

It may be helpful to describe an example system which performs the process of FIG. 1. The following figure illustrates one such example system.

Figure 2A:
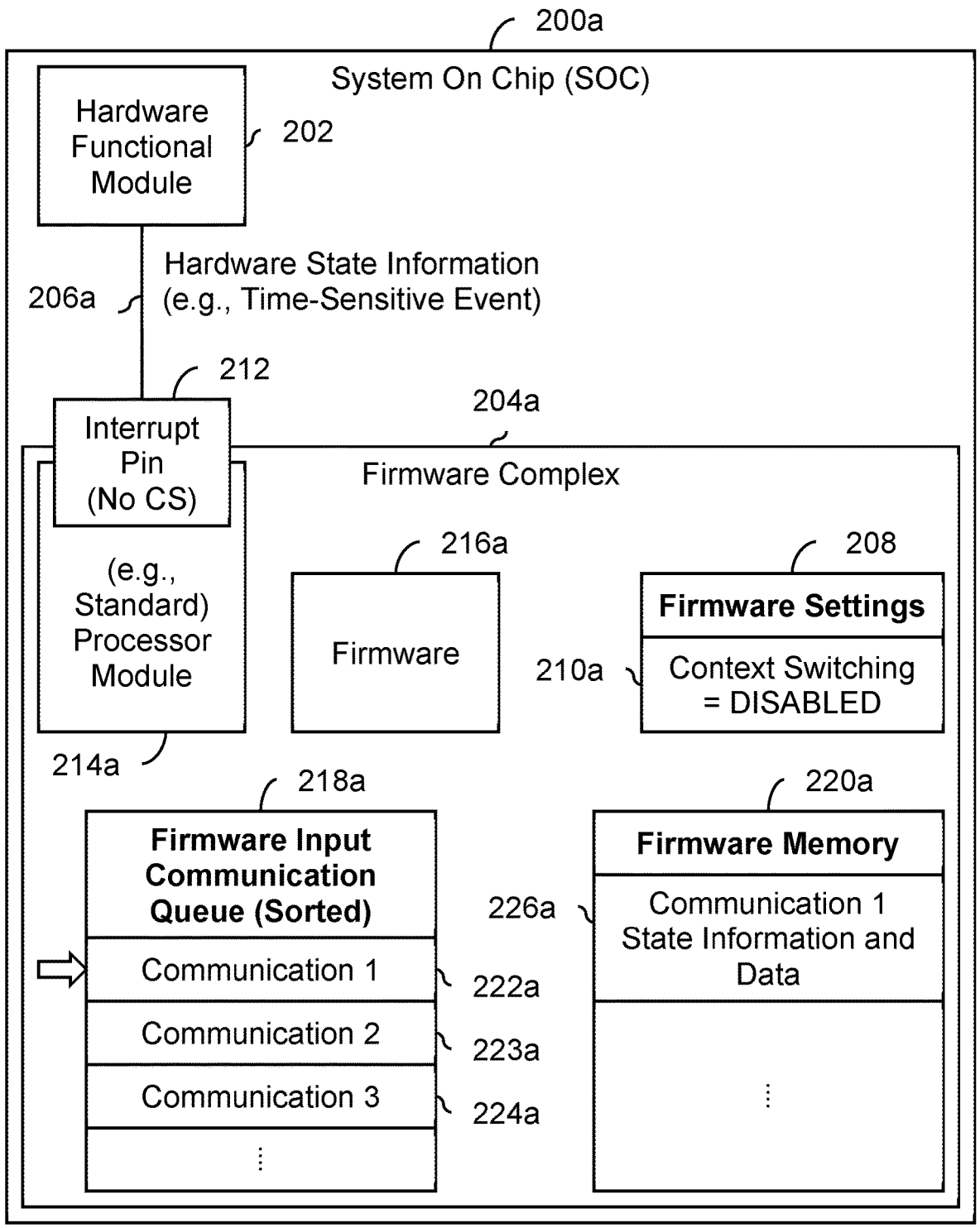
FIG. 2A is a diagram illustrating an embodiment of a processor module with context switching disabled for an interrupt pin in a processor module at a first point in time.

FIG. 2A is a diagram illustrating an embodiment of a processor module with context switching disabled for an interrupt pin in a processor module at a first point in time. In this example, an SOC (200a) includes a hardware functional module (202) (i.e., a functional module that is implemented in hardware) and a firmware complex (204a). The firmware complex (204a) includes a processor module (214a) and firmware (216a) which runs on the processor module.

In some embodiments, the processor module (214a) is a standard processor module (i.e., the processor module is not customized and/or custom-built). In some embodiments, a processor module (e.g., 214a) is a (e.g., standard) third-party IP that is purchased and/or licensed for non-exclusive use in the SOC (200a).

In this example, the hardware functional module (202) generates and outputs hardware state information (206a). For example, the hardware state information may come from (e.g., internal) registers in the hardware functional module (202) and these registers are passed to some output pin or output port of the hardware functional module (202) and from there they are passed or otherwise routed (e.g., in the SOC) to the interrupt pin (212) with context switching disabled.

In some embodiments, the hardware state information (206a) is indicative of a time-sensitive event (e.g., in the hardware functional module (202) or known to the hardware functional module (202)) to be handled or otherwise addressed by the firmware complex (204a). For example, there may be some time-sensitive requests or instructions that should be handled by the firmware complex (204a) promptly (e.g., by having the firmware complex (204a) promptly initiate downstream processes and/or steps at appropriate downstream hardware functional module(s)).

In the state shown here, the firmware settings (208) have context switching set to a disabled value (210a). As a result, when the hardware state information (206a) is received by the firmware complex (204a) via the interrupt pin (212), the firmware complex (204a) will not context switch in response to the notification at the interrupt pin (212).

In this example, the firmware input communication queue (218a) stores input communications that are awaiting analysis, execution, and/or processing by the firmware (216a) running on the processor module (214a). Various examples of the communications (e.g., 222a-224a) that are stored in the firmware input communication queue (218a) include instructions to be performed by firmware (216a), status and/or command messages from hardware functional modules (e.g., 202) in the SOC (200a), etc. The communications are sorted within the firmware input communication queue (218a) in the order in which they will be processed, for example, per handling and/or ordering rules. In the state shown here, firmware (216a) is currently processing or otherwise working on Communication 1 (222a).

If context switching were instead turned on (opposite of which is shown in 210a), the handling rules would dictate that the hardware state information (206a) received via the interrupt pin (212) be analyzed or otherwise scrutinized immediately, including by performing context switching. For example, in the state shown here, the firmware memory (220a) currently holds Communication 1 state information and data (226a) which is associated with Communication 1 (222a) at the top of the firmware input communication queue (218a) and which is currently and/or actively being processed by firmware (216a) running on the processor module (214a). For example, the Communication 1 state information and data (226a) may be partially-completed and/or mid-process data or state information that the firmware (216a) temporarily stores in the firmware memory (220a) while working towards a final decision, result, and/or output. If context switching were supported or enabled for the interrupt pin (212), then Communication 1 state information and data (226a) would be swapped out of firmware memory (220a) and similarly processing of Communication 1 (222a) would be interrupted and/or paused (e.g., mid-operation).

However, context switching is time consuming, disruptive, and/or undesirable at least in some applications. So while timely and/or prompt handling of the notification (206a) is desired, context switching is undesirable. As such, context switching is disabled in this example and therefore none of the context switching described above would be performed in response to the hardware state information (206a) that is received via the interrupt pin (212).

The following figure continues the example shown here.

Figure 2B:
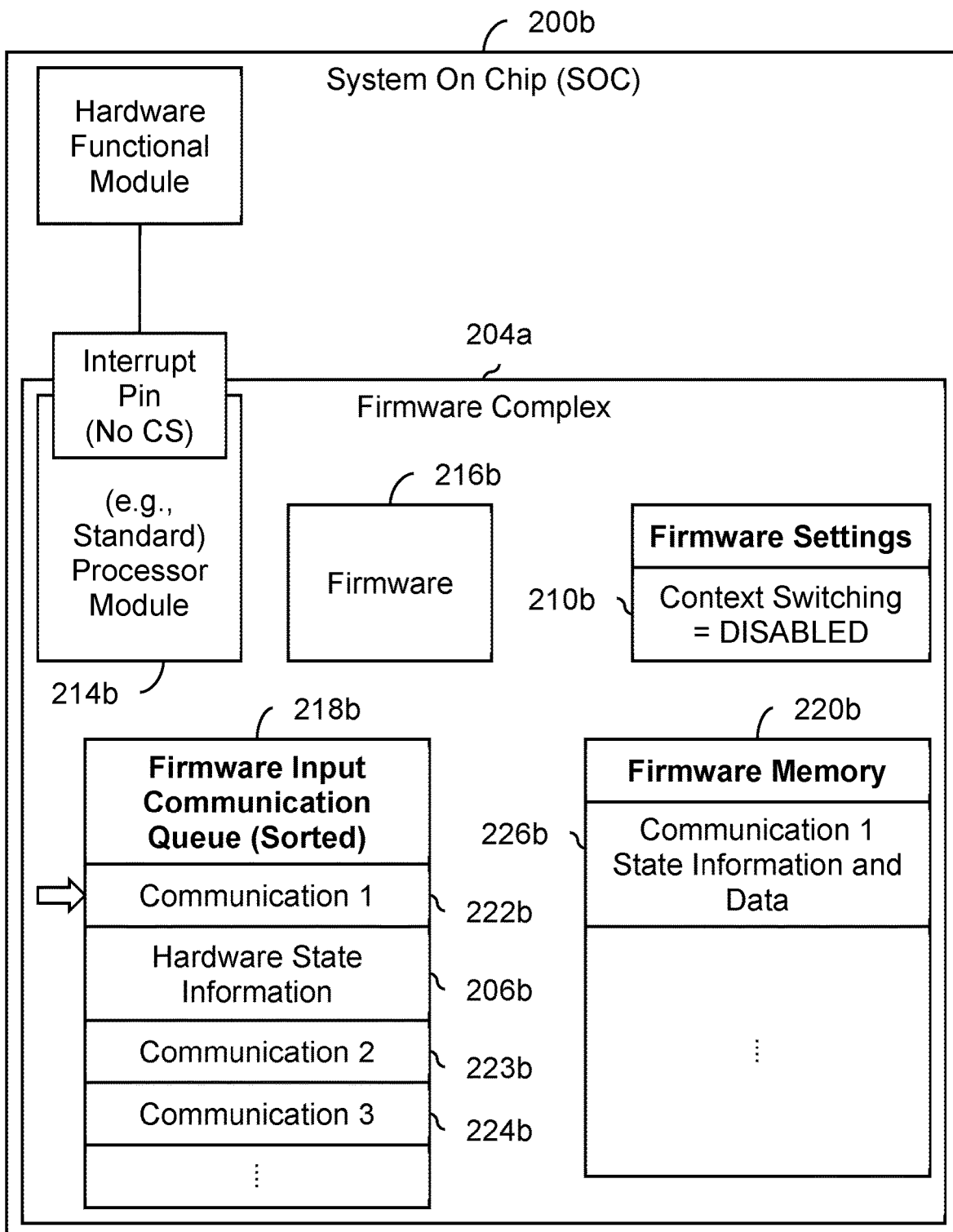
FIG. 2B is a diagram illustrating an embodiment of a processor module with context switching disabled for an interrupt pin in a processor module at a second point in time.

FIG. 2B is a diagram illustrating an embodiment of a processor module with context switching disabled for an interrupt pin in a processor module at a second point in time. In this example, the SOC (200b) is shown at a later point in time compared to the example of FIG. 2A. In the state shown here, the hardware state information (206b) has been added to the firmware input communication queue (218b) after Communication 1 (222b), which is actively being processed by the processor module (214b) and firmware (216b), but before Communication 2 (223b) and Communication 3 (224b), which the processor module (214b) and firmware (216b) have not yet gotten to. For example, this position or ordering within the firmware input communication queue (218b) may be due to context switching disabled handling or sequence rules which specify the priority and/or ordering in which communications are processed or handling.

Since context switching is disabled (see, e.g., 210b), Communication 1 (222b) is not preempted by the hardware state information (206b) and Communication 1 state information and data (226b) is not ejected from the firmware memory (220b). Instead, the firmware (216b) continues to process Communication 1 (222b) until complete. At that time, Communication 1 state information and data (226b) is no longer needed and would be (e.g., per standard operating procedure) cleared from the firmware memory (220b). Similarly, Communication 1 (222b) would be removed from the firmware input communication queue (218b) and the processor module (214b) and firmware (216b) would then begin processing of the hardware state information (206b), which is next in the (e.g., sorted) firmware input communication queue (218b).

It is noted that the ability to turn context switching off or on (e.g., via 210a/210b) is a feature and/or capability that is exposed or otherwise supported by many types of processor modules (e.g., over a variety of processor module products from a variety of third-party IP providers) and so this technique has wide applicability and/or utility.

It may be helpful to illustrate the technique using a specific application as an example. The following figure describes an example where the SOC is a storage controller that sits between a host and NAND Flash storage media.

Figure 3:
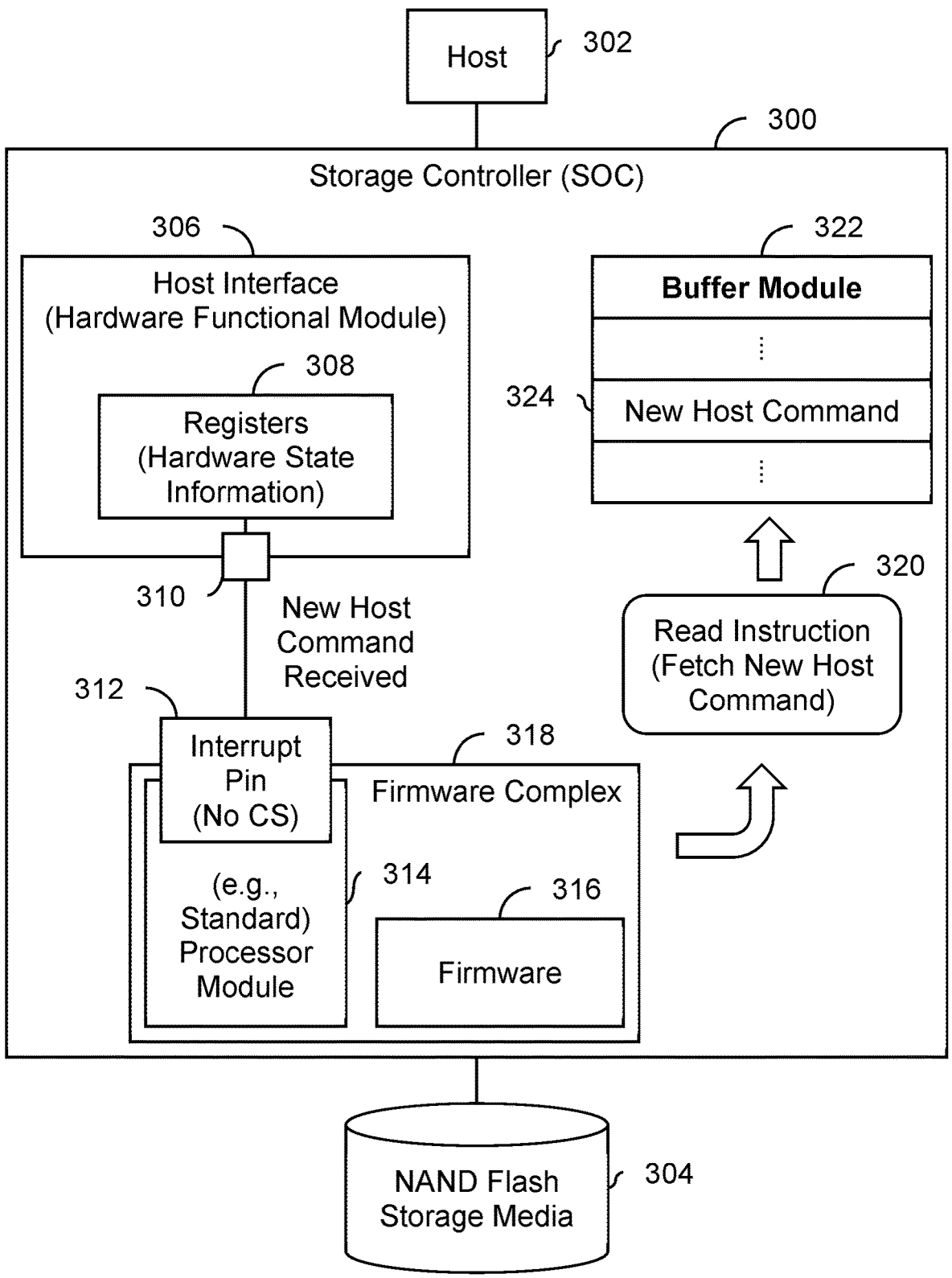
FIG. 3 is a diagram illustrating an embodiment of a storage controller in which a host interface sends hardware state information to a firmware complex via two or more interrupt pins.

FIG. 3 is a diagram illustrating an embodiment of a storage controller in which a host interface sends hardware state information to a firmware complex via two or more interrupt pins. In this example, the storage controller (300) is implemented as an SOC. The storage controller (300) sits between a host (302) and NAND Flash storage media (304) and performs read and write operations to the NAND Flash storage media (304) as instructed by the host (302).

A host interface (306), which is implemented as a hardware functional module in the storage controller (300), communicates and/or interfaces with the host (302). The host interface (306) includes registers (308) which store hardware state information. One of the registers and/or bits is associated with an indication that a new command has been received from the host. In this example, the output of that register (308) is passed to a (e.g., output) port (310) of the host interface (306).

From the (output) port (310) of the host interface (306), the "new host command received" information (e.g., a number of commands received, type of command(s) received, priority of commands received, etc.) is passed to a specific (e.g., pre-defined and/or configured) set of interrupt pins (312) in the (e.g., standard) processor module (314). The processor module (314) and firmware (316) that runs on the processor module (316) are part of the firmware complex (318). In this example, context switching has been disabled for the interrupt pin (312) that is used to receive the "new host command received" information.

In response to receiving, via interrupt pin (312), an indication that a new command has been received from the host (302), the firmware complex (318) generates and sends a read instruction and/or message (320) which is sent to a buffer module (322) in the storage controller (300). To put it another way, the message (320) will fetch the one or more new host commands (324) from the buffer module (322). In this example, the buffer module (322) is used to store large pieces of data, including the new host commands (324) which were received from the host (302). In response to receiving the read command (320), the buffer module (322) will return the new host command (324) to the firmware complex (318) so that the firmware complex (318) can analyze the new host command and determine next steps and/or a next batch of messages or instructions to send to (other) hardware functional modules within the storage controller (300). For example, if multiple commands were received concurrently, the firmware may analyze at least two commands to determine if they are related, and if they related, may combine the dependent NAND Flash media read operations to improve system performance.

It is noted that because context switching is disabled or otherwise turned off for the interrupt pin (312), the read instruction (320) is generated after any active and/or current operations and/or processes have been completed by the firmware complex (318). To put it another way, the firmware complex does not context switch in response to the indication that a new host command has been received and therefore any mid-process data and/or any partially-completed operation is/are not halted or ejected mid-operation. It may be further noted that because the context switching is disabled, multiple interrupt pins can be used in conjunction to provide complex (i.e., multi-bit) state information to the firmware, instead of simply event notification.

In this example application (i.e., a storage controller (300)), any new command that is received from the host (302) is important and should be responded to quickly. By using the interrupt pin (312) with context switching disabled, the firmware complex (318) can detect and respond to new host command messages using a standard processor module (314) and without provoking a disruptive context switching event.

As shown in this example, in some embodiments, the SOC (e.g., referred to in FIG. 1) is associated with a storage controller (e.g., 300 in FIG. 3); the hardware functional module (e.g., referred to at step 102 in FIG. 1) is associated with a host interface (e.g., 306 in FIG. 3) that communicates with a host (e.g., 302 in FIG. 3) that is external to the storage controller (e.g., 300 in FIG. 3); the hardware state information is associated with an indication that a new command has been received from the host; and the response (e.g., 320 in FIG. 3) is associated with accessing the new command (e.g., 324 in FIG. 3) from a buffer module (e.g., 322 in FIG. 3).

In some embodiments, multiple hardware functional modules and multiple (e.g., standard) processor modules communicate using interrupt pins via an interrupt bus. The following figures describe an example of an interrupt bus and associated interrupt registers, the latter of which is used to generate or otherwise drive some of the bits in the interrupt bus.

FIG. 4A is a table illustrating an embodiment of bits in an interrupt bus and their associated usage. In this example, the table (400) shows bits in an interrupt bus and associated information where m hardware functional modules and n (e.g., standard) processor modules communicate time-sensitive events or information (as an example) using the exemplary interrupt bus.

In this example, each hardware functional module sends multi-bit state information (i.e., two or more bits of state information) to each processor module (e.g., 402 and 404). The bits are used by each respective hardware functional module to send notifications and/or time-sensitive hardware state information to one or more processor modules. For example, as row 402 shows, the bits [i:0] (e.g., where i≥1) in the interrupt bus are driven by Hardware Functional Module 1 and the usage is for Hardware Functional Module 1 to notify one or more of the processor modules. Similarly, as row 404 shows, bits [k−1:j] in the interrupt bus are driven by Hardware Functional Module m and the usage is for Hardware Functional Module m to notify one or more of the processor modules.

In some applications, the number of hardware functional modules may exceed the number of bits in the interrupt bus that are allocated or otherwise budgeted for hardware functional modules. In some such embodiments, multiple hardware functional modules share a single bit in the interrupt bus. Because the techniques described herein utilize multiple interrupt pins/bits, other low-urgency interrupts can be combined to free up pins, as or if needed. For example, this may be done using a hierarchical structure and/or registers may be read to determine which of the hardware functional modules is sending the notification via the shared bit in the interrupt bus.

Bits [k+n−1:k] (406) and bits [k+n$^2$−1:k+n(n−1)] (408) bits in the interrupt bus are obtained from interrupt registers that the processor modules can write to. The following figure illustrates an example of how those bits (406, 408, etc.) in the exemplary interrupt bus are generated from the exemplary interrupt registers.

Figure 4B:
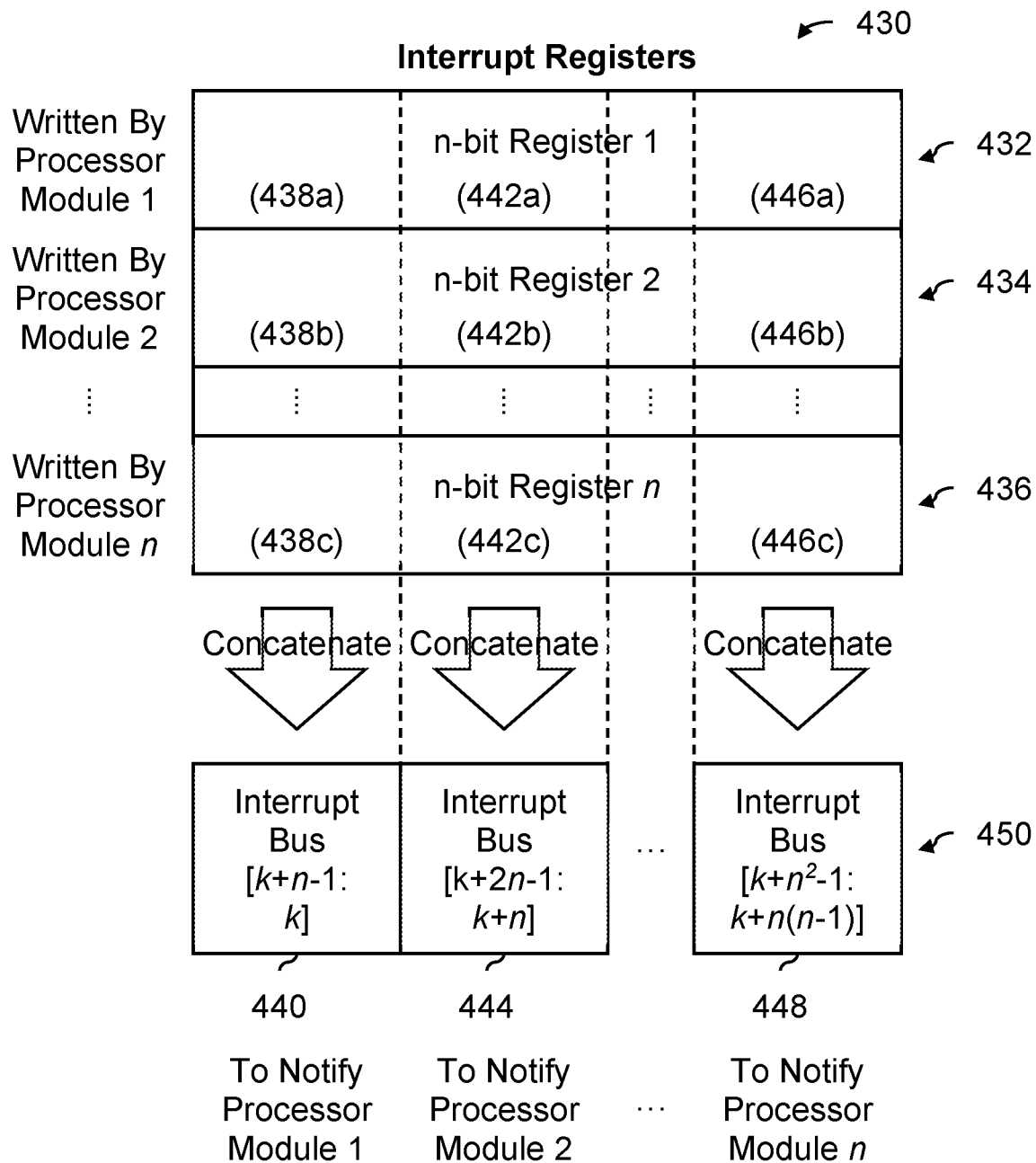
FIG. 4B is a diagram illustrating an embodiment of interrupt registers and how they are used to generate some of the bits in an associated interrupt bus.

FIG. 4B is a diagram illustrating an embodiment of interrupt registers and how they are used to generate some of the bits in an associated interrupt bus. An example of interrupt registers (430) is shown here. In this example, n-bit Register 1 (432) is written by Processor Module 1, n-bit Register 2 (434) is written by Processor Module 2, and so on until n-bit Register n (436) is written by Processor Module n.

Each column of bits is concatenated together to generate an n-bit vector in the interrupt bus. For example, the leftmost bits (438a-438c) in the interrupt registers (430) are concatenated together to produce bits [k+n−1:k] (440) of the interrupt bus used to notify Processor Module 1. Similarly, the second-from-left bits (442a-442c) in the interrupt registers (430) are concatenated together to produce bits [k+2n−1:k+n] (444) of the interrupt bus used to notify Processor Module 2; the rightmost bits (446a-446c) in the interrupt registers (430) are concatenated together to produce bits [k+n$^2$−1:k+n(n−1)] (448) of the interrupt bus used to notify Processor Module n. For example, a concatenate operation permits the notified processor to know exactly which processor(s) and/or functional module(s) sent the notification (e.g., "X interrupted me" or "X and Y interrupted me"). A concatenate operation (as shown in the example of FIG. 4B) may be preferable to an OR operation (e.g., performed along each column) in at least some applications. An OR operation would result in less information transferred concurrently, requiring a second level of information gathering to determine the exact source of the interrupt. The OR would say "Someone interrupted me, but I don't know who," whereas the concatenation says, "Processor X interrupted me" or "Processors X and Y are interrupting me." Since time-sensitive information is being conveyed and a prompt response or reaction is often desired, using a concatenate operation which conveys more information simultaneously may be preferred over an OR operation which conveys less information simultaneously.

As shown in row 450, this is how bits k through k+n$^2$−1 of the bus may be obtained from the interrupt registers (430).

It is noted that a given processor module would not necessarily use this mechanism to notify itself so (as an example) Processor Module 1 would not necessarily write a 1 to leftmost interrupt register bit 438a to notify Processor Module 1 (i.e., itself). However, Processor Module 1 may (as an example) write a 1 to second-from-left interrupt register bit 442a to notify Processor Module 2 (e.g., about a time-sensitive event). By extension, if the processors do not use the mechanism to notify themselves, the interrupt bus bit corresponding to the "self" signal may be omitted from each processor connection (if desired). And by inverse extension, the inclusion of "self-notification" can be used as a firmware self-test mechanism (if desired), even when it has no other functional use in the SOC.

Figure 4C:
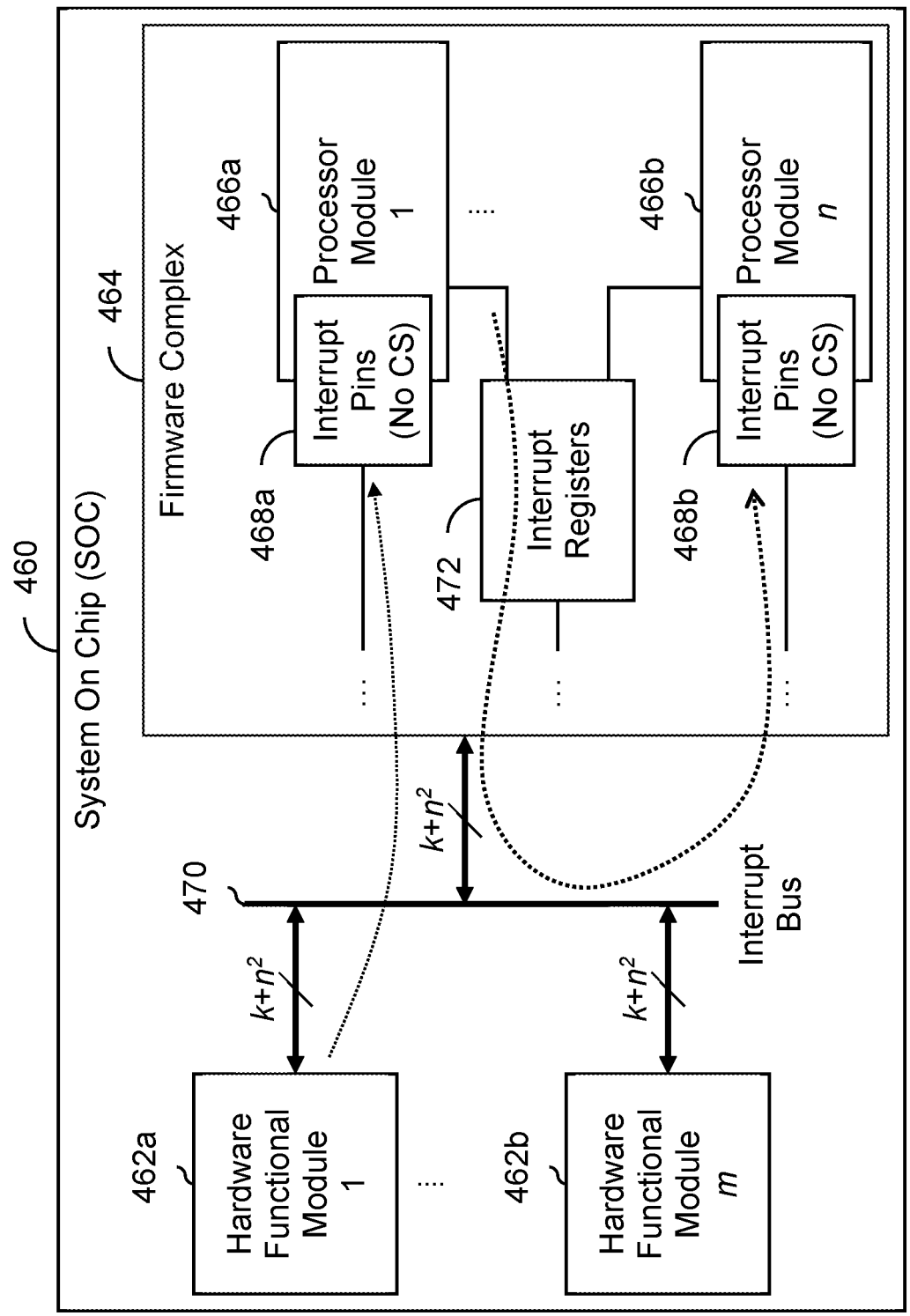
FIG. 4C is a diagram illustrating an embodiment of an SOC with multiple hardware functional modules and multiple processor modules that communicate using an interrupt bus.

FIG. 4C is a diagram illustrating an embodiment of an SOC with multiple hardware functional modules and multiple processor modules that communicate using an interrupt bus. In this example, an SOC (460) includes m hardware functional modules (462a-462b) and a firmware complex (464) which includes n processor modules (466a-466b). An interrupt bus (470) with k+n² bits connects the hardware functional modules (462a-462b) and the firmware complex (464).

For example, Hardware Functional Module 1 (462a) may use the interrupt bus (470), two or more bits of which are passed to interrupt pins (468a) with context switching turned off to communicate (e.g., time-sensitive) hardware state information to Processor Module 1 (466a). In another example, Processor Module 1 (466a) may quickly communicate with Processor Module n (466b) by writing to the interrupt registers (472) which are combined and output on the interrupt bus (470); the n bits of the interrupt bus (e.g., that are used to notify that processor module) are then input to n interrupt pins (468b) of Processor Module n (466b).

In some embodiments, the interrupt registers (472) are located very close to a processor module path so that only a few processor cycles are needed by a processor module to write to and/or update the interrupt registers (472). To put it another way, the interrupt registers may be implemented in "fast path" registers in and/or quickly accessible by a processor module.

Returning briefly to FIG. 4A, table 400 shows one example of how the m+n bits in an interrupt bus may be used and/or interpreted. See also FIG. 4B, which shows one example of how the interrupt registers (472) in FIG. 4C, which the processor modules (466a-466b) in FIG. 4C can write to, may be used to generate bits [k+n²−1:k] in the interrupt bus (470) in FIG. 4C.

It is noted that once hardware state information and/or a notification is received via an interrupt pin, the notified processor module may (as or if needed) access hardware state information (e.g., stored in registers in one of the hardware functional modules (462a-462b)) to obtain more detailed hardware state information before deciding on a course of action and/or a response to send. Similarly, if one of the processor modules notifies another processor module, the notified processor module may access the interrupt registers (472) to determine which processor module sent the notification. If needed, additional (e.g., state) information may be obtained (e.g., stored in registers in the processor module (e.g., one of 466a-466b) that sent the notification) before deciding on a course of action and/or a response to send.

In one example application, one of the hardware functional modules (e.g., 462a) may occasionally enter an error or exception state where it is desirable to halt or otherwise pause multiple processor modules (e.g., both Processor Module 1 (466a) as well as Processor Module n (466b)) because it is difficult to synchronize back and/or "rewind" to a proper and/or desired (e.g., restart) state. The interrupt bus example described in FIGS. 4A-4C permits a hardware functional module to (as an example) quickly and simultaneously stop multiple processor modules. Without the interrupt bus, a two-level communication may be required where (only) a first processor module is notified and then the first processor module relays a notification to a second processor module. With such a two-level communication, it may be difficult or impossible to simultaneously stop multiple processor modules.

In another example application, the interrupt bus described in FIGS. 4A-4C permits one processor module to notify and/or halt one or more other processor modules, quickly and/or simultaneously. Without the interrupt bus, the processor modules were limited to communicating via "mailboxes" (e.g., either go through an AHB bus into another processor module's memory through a slave port or via a shared SRAM) which is slower and may not be synchronous and/or simultaneous if multiple processor modules need to be notified.

In some embodiments, the SOC (460) is a synchronous multi-processor (SMP) embodiment where the m processor modules (466a-466b) run the same firmware. As can be imagined, in such SMP embodiments, if one processor module is to be halted then all should be halted since they are running the same firmware and performing the same set of operations and/or processing. The interrupt bus in this example enables broadcasting (e.g., from one processor module to all (other) processor modules in the SMP group) as or if needed.

For example, suppose the SOC (460) is a storage controller that sits between a host and (e.g., NAND Flash) storage media and the host initiates a change of power states or modes to a lower power mode, or a power management unit (PMU) in the storage controller decides the storage controller should enter a lower power mode because it has been inactive for a very long amount of time, then the first processor module that detects the state change can broadcast the power state change to the rest of the processor modules. (Alternatively, the PMU, which is a hardware functional module in the SOC, may initiate or otherwise indicate a change in power state via an interrupt bus and/or interrupt pin(s).) The processor modules may have some mid-process or mid-operation data stored in volatile memory (which will be lost in the lower power state) and the processor modules may move such data from volatile memory to non-volatile memory so that it can be recovered after exiting the lower power state.

Similarly, when it is time for a storage controller to exit a lower power state, an interrupt bus and/or interrupt pin(s) may be used to broadcast such a state change to all of the processor modules in a simultaneous fashion.

In various embodiments, various configurations of one or more hardware functional modules, one or more processor modules, and/or an interrupt bus may be employed (e.g., depending upon which modules want to talk to each other using the interrupt bus and/or which bits in the interrupt bus are of interest to a given module). The following figures show some example configurations.

Figure 5:
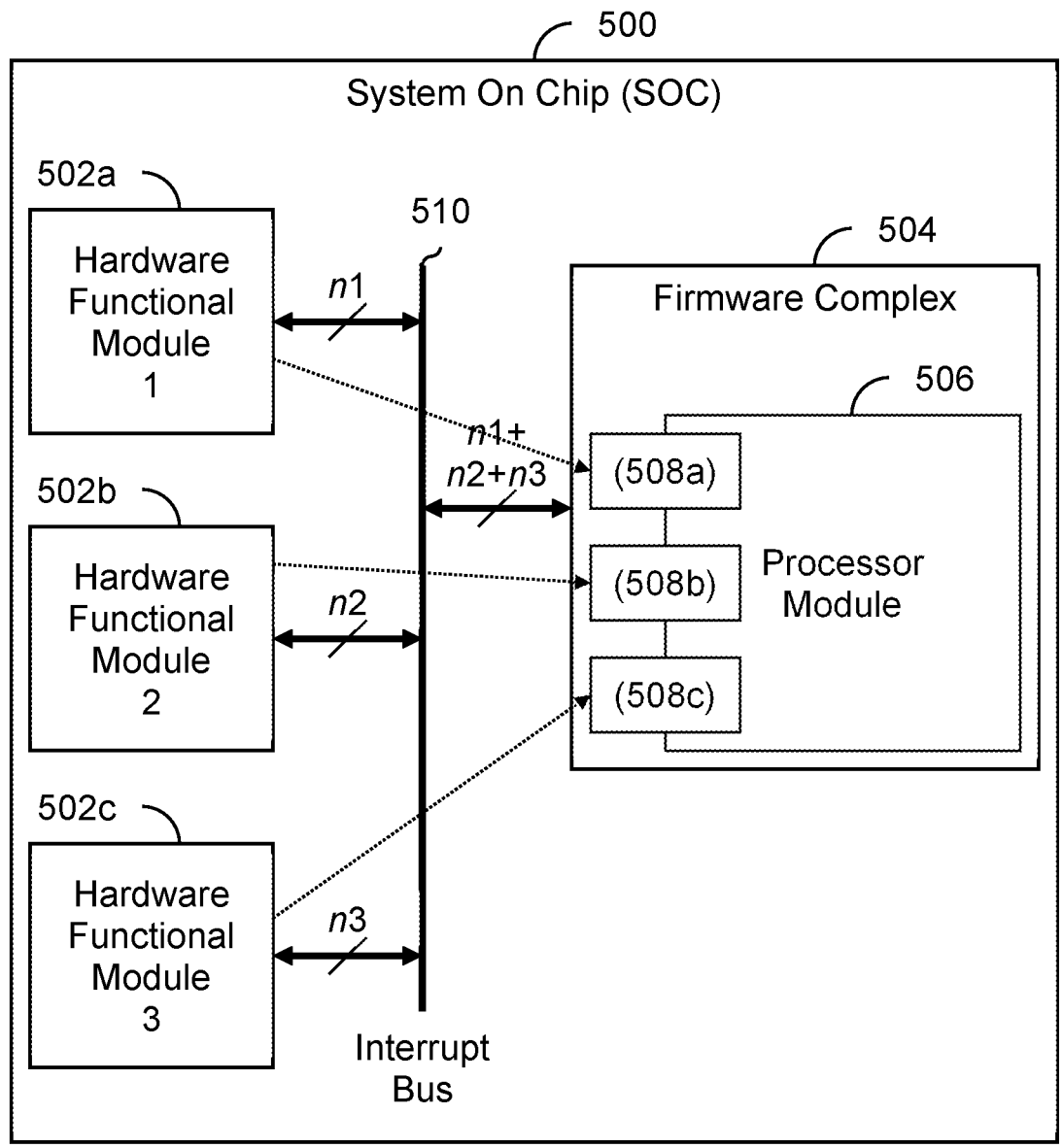
FIG. 5 is a diagram illustrating an embodiment of a symmetric configuration between multiple hardware functional modules and a single processor module.

FIG. 5 is a diagram illustrating an embodiment of a symmetric configuration between multiple hardware functional modules and a single processor module. In this example, the SOC (500) includes three hardware functional modules (502a-502c) and a firmware complex (504) with a single processor module (506). The processor module (506) has multiple interrupt pins (508a-508c) with context switching disabled (as described above). The first group of one or more interrupt pins (508a) is associated with n1 bits in the interrupt bus (510) that are driven by Hardware Functional Module 1 (502a). The second group of one or more interrupt pins (508b) is associated with n2 bits in the interrupt bus (510) that are driven by Hardware Functional Module 2 (502b). The third group of one or more interrupt pins (508c) is associated with n3 in the interrupt bus (510) that are driven by Hardware Functional Module 3 (502c). In some embodiments, at least one of n1, n2, or n3 is greater than or equal to two.

Figure 6:
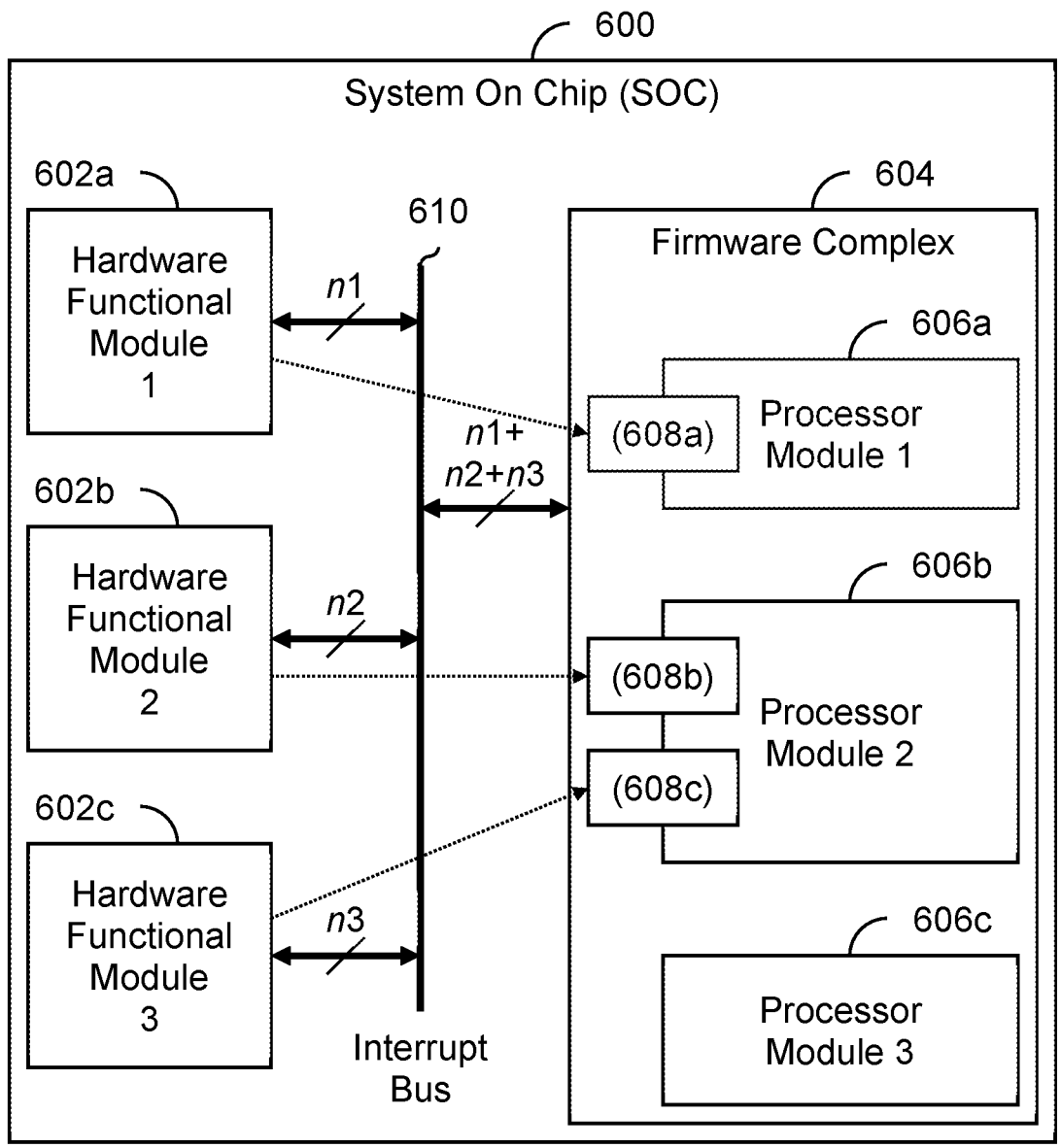
FIG. 6 is a diagram illustrating an embodiment of an asymmetric configuration between multiple hardware functional modules and multiple processor modules.

FIG. 6 is a diagram illustrating an embodiment of an asymmetric configuration between multiple hardware functional modules and multiple processor modules. In this example, the SOC (600) includes three hardware functional modules (602a-602c) and a firmware complex (604) with three processor modules (606a-606c). Processor Module 1 (606a) has a first group of one or more interrupt pins (608a) and Processor Module 2 (606b) has two groups of one or more interrupt pins (608b and 608c), all of the interrupt pins having context switching disabled. The first group of interrupt pins (608a) is associated with a n1 bits in the interrupt bus (610) that are driven by Hardware Functional Module 1 (602a) and are used to notify Processor Module 1 (606a). The second and third groups of interrupt pins (608b and 608c) are associated with a n2 bits and n3 bits, respectively, in the interrupt bus (610) that are driven respectively by Hardware Functional Module 2 (602b) and Hardware Functional Module 3 (602c). This permits Hardware Functional Module 2 (602b) and Hardware Functional Module 3 (602c) to quickly notify Processor Module 2 (606b). Processor Module 3 (606c) may have interrupt pins, but those interrupt pins are not connected to the interrupt bus (610). In some embodiments, at least one of n1, n2, or n3 is greater than or equal to two.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A System On Chip (SOC), comprising:
a configuration controller that sends, to a processor module in the SOC and associated with firmware, configuration information, wherein in response to receiving the configuration information, context switching associated with an interrupt pin in the processor module is disabled;
a hardware functional module that sends, from the hardware functional module in the SOC to the interrupt pin, hardware state information, wherein in response to receiving the hardware state information, the processor module determines, based at least in part on the hardware state information and after completing any active firmware operations per the disabled context switching, a response; and
a responding module, wherein the responding module:
receives the response; and
performs a process associated with the response.

2. The SOC recited in claim 1, wherein the responding module includes the hardware functional module.

3. The SOC recited in claim 1, wherein:
the SOC is associated with a storage controller;
the hardware functional module is associated with a host interface that communicates with a host that is external to the storage controller;
the hardware state information is associated with an indication that a new command has been received from the host; and
the response is associated with accessing the new command from a buffer module.

4. The SOC recited in claim 1, further including:
a second hardware functional module;
a second processor module with a second interrupt pin with context switching disabled; and
an interrupt bus, having a plurality of bits, that connects the hardware functional module, the second hardware functional module, the interrupt pin in the processor module, and the second interrupt pin in the second processor module, wherein:
a first bit in the interrupt bus is driven by the hardware functional module and is used to notify at least one of the processor module or the second processor module; and
a second bit in the interrupt bus is driven by the second hardware functional module and is used to notify at least one of the processor module or the second processor module.

5. The SOC recited in claim 1, further including:
a second processor module with a second interrupt pin with context switching disabled; and
an interrupt bus, having a plurality of bits, that connects the hardware functional module, the interrupt pin in the processor module, and the second interrupt pin in the second processor module, wherein a given bit in the interrupt bus is driven by the processor module and is used to notify the second processor module.

6. A method, comprising:
sending, from a configuration controller to a processor module in a System On Chip (SOC) and associated with firmware, configuration information, wherein in response to receiving the configuration information, context switching associated with an interrupt pin in the processor module is disabled;
sending, from a hardware functional module in the SOC to the interrupt pin, hardware state information, wherein in response to receiving the hardware state information, the processor module determines, based at least in part on the hardware state information and after completing any active firmware operations per the disabled context switching, a response;
receiving, at a responding module, the response; and
performing, at the responding module, a process associated with the response.

7. The method recited in claim 6, wherein the responding module includes the hardware functional module.

8. The method recited in claim 6, wherein:
the SOC is associated with a storage controller;
the hardware functional module is associated with a host interface that communicates with a host that is external to the storage controller;
the hardware state information is associated with an indication that a new command has been received from the host; and
the response is associated with accessing the new command from a buffer module.

9. The method recited in claim 6, wherein the SOC further includes:
a second hardware functional module;
a second processor module with a second interrupt pin with context switching disabled; and
an interrupt bus, having a plurality of bits, that connects the hardware functional module, the second hardware functional module, the interrupt pin in the processor module, and the second interrupt pin in the second processor module, wherein:
- a first bit in the interrupt bus is driven by the hardware functional module and is used to notify at least one of the processor module or the second processor module; and
- a second bit in the interrupt bus is driven by the second hardware functional module and is used to notify at least one of the processor module or the second processor module.

10. The method recited in claim 6, further including:
a second processor module with a second interrupt pin with context switching disabled; and
an interrupt bus, having a plurality of bits, that connects the hardware functional module, the interrupt pin in the processor module, and the second interrupt pin in the second processor module, wherein a given bit in the interrupt bus is driven by the processor module and is used to notify the second processor module.

* * * * *